(12) United States Patent
Kim et al.

(10) Patent No.: US 7,869,006 B2
(45) Date of Patent: Jan. 11, 2011

(54) LASER MEASURING DEVICE

(75) Inventors: Hong Ki Kim, Gyunggi-do (KR); Chan Yong Park, Gwangju (KR); Seung Won Lee, Daejeon (KR); Sun Ki Min, Seoul (KR)

(73) Assignees: Samsung Electro-Mechanics Co., Ltd., Gyunggi-do (KR); Wooriro Optical Telecom, Gwangju (KR)

( * ) Notice: Subject to any disclaimer, the term of this patent is extended or adjusted under 35 U.S.C. 154(b) by 217 days.

(21) Appl. No.: 12/202,645

(22) Filed: Sep. 2, 2008

(65) Prior Publication Data

US 2009/0091739 A1 Apr. 9, 2009

(30) Foreign Application Priority Data

Oct. 5, 2007 (KR) .................. 10-2007-0100359
Oct. 5, 2007 (KR) .................. 10-2007-0100360

(51) Int. Cl.
*G01C 3/08* (2006.01)

(52) U.S. Cl. ............... 356/5.09; 356/5.01; 356/5.1; 356/5.15

(58) Field of Classification Search ....... 356/5.01–5.15, 356/3.01–3.15, 4.01–4.1, 6–22, 28, 28.5
See application file for complete search history.

(56) References Cited

U.S. PATENT DOCUMENTS 6,411,371 B1 * 6/2002 Hinderling et al. ......... 356/4.01
6,559,933 B1 * 5/2003 Kirkpatrick et al. ........ 356/28.5
2003/0184729 A1 * 10/2003 Bowers ....................... 356/5.1
2006/0192975 A1 8/2006 Sato et al.

FOREIGN PATENT DOCUMENTS

JP 63-083683 4/1988
JP 2006-242570 9/2006

OTHER PUBLICATIONS

Korean Office Action issued in Korean Patent Application No. KR 10-2007-0100360, dated Mar. 16, 2009.
Korean Office Action issued in Korean Patent Application No. KR 10-2007-0100359, dated Jul. 30, 2009.

* cited by examiner

*Primary Examiner*—Thomas H Tarcza
*Assistant Examiner*—Luke D Ratcliffe
(74) *Attorney, Agent, or Firm*—McDermott Will & Emery LLP

(57) ABSTRACT

A laser measuring device maintains high responsivity irrespective of changes in surrounding environment, provides more correct measurement and long distance measurement due to reduced noise, and ensures the safety and reliability of a product. A first light emitter emits first wavelength light having a first wavelength. A second light emitter emits second wavelength light having a second wavelength, the second light emitter being arranged perpendicular to the first light emitter. An optical mirror allows one of the first wavelength light and the second wavelength light to pass but reflecting the other one. A first band pass filter for allows the first wavelength light to pass. A second band pass filter allows the second wavelength light to pass. A light receiver receives incident light, which arrives through one of the first and second band pass filters. A controller activates at least one of the first and second light emitters.

16 Claims, 8 Drawing Sheets

LASER MEASURING DEVICE

CROSS-REFERENCE TO RELATED APPLICATIONS

This application claims the priorities of Korean Patent Application No. 2007-100359, filed on Oct. 5, 2007 and Korean Patent Application No. 2007-100360, filed on Oct. 5, 2007, in the Korean Intellectual Property Office, the disclosure of which is incorporated herein by reference.

BACKGROUND OF THE INVENTION

1. Field of the Invention

The invention relates to a laser measuring device, in particular, which can maintain high responsivity irrespective of changes in surrounding environment, provide more correct measurement and long distance measurement due to reduced noise, and ensure the safety and reliability of a product.

2. Description of the Related Art

Space/object sensors for detecting three dimensional space and object can be divided into contact and non-contact sensors. Contact sensors are generally used in standard environments such as a factory, a building and an industrial site, whereas non-contact sensors can also be flexibly applied to non-standard environments in which various objects are measured.

Non-contact 3D space sensors are a device that acquires data, such as the distance to and the width and height of an object to be measured. The non-contact 3D space sensors radiate a sound wave such as a supersonic wave or a specific frequency of electromagnetic wave such as a laser beam and a Radio Frequency (RF) wave to the object in order to extract amplitude, (round trip) time, a phase value and so on from the wave refracting from the object.

Of these sensors, space sensors using the RF or supersonic wave are merely applicable to the recognition of a space in a short distance (several meters) owing to poor convergence and spatial resolution. That is, these sensors are generally used in limited fields, such as rear distance detection systems and cleaning robots. Conversely, sensors using a light source have merits, such as adjustable convergence, a high measuring speed, a high precision and a wide measuring range per unit time, and thus can be applied to various fields such as construction, military, autonomous mobile robots, topographic surveying systems and aerospace industry, which require the ability of measuring an object in a long distance (several kilometers) with a high resolution and a high speed.

The method of measuring the spatial distance to an object using a light source can be generally divided into triangulation, Time-Of-Flight (TOF) technology and interferometry.

The triangulation is a method of determining a spatial position of a specific point by analyzing a triangle, which are defined by the specific point and the other two points, the location information of which is already known. In the interferometry, that is, a measuring system using an interferometer, a beam is modulated into a predetermined frequency of sine wave, is radiated to an object, and is reflected from the object. The distance to the object is measured using the Optical Path Difference (OPD) between the reflected beam and the original beam, which is obtained when the beams are recombined after traveling along different optical paths. The TOF technology radiates a laser pulse into a space, detects a returning pulse using a light detecting device, and calculates the time difference between the radiation pulse and the returning pulse, thereby producing the distance to an object.

While the triangulation has excellent precision in short distance measurement, this method is not suitable for long distance measurement since a measurement error increases in proportion to the measuring distance. In the case of the measuring system using an interferometer, the distance to an object is measured based upon the OPD between a reference beam and a measuring (returning) beam. Thus, a reflector capable of reflecting the measuring beam should be attached to the object. That is, a space sensor according to this measuring system has drawbacks such as limited use and high price even though it can measure the object with a very high precision of, for example, several millimeters (mm).

Conversely, a sensor according to the TOF technology can calculate the distance to an object in a relatively simple fashion by detecting a pulse dispersing from the object even if a specific device is not attached to the object. As advantages, the TOF sensor can easily measure a long distance without spatial limitations. However, the TOF technology calculates the distance based on the time difference, obtained by measuring the reflecting pulse, and thus requires a high efficiency optical system, which can detect a faint pulse dispersing and returning from an object.

Accordingly, it is required to develop an approach to raise responsivity in the TOF sensor, which has a simple structure and is widely applicable.

SUMMARY OF THE INVENTION

The present invention has been made to solve the foregoing problems with the prior art, and therefore the present invention provides a laser measuring device, which can maintain high responsivity irrespective of changes in surrounding environment, provide more correct measurement and long distance measurement due to reduced noise, and ensure the safety and reliability of a product.

According to another aspect of the present invention, there is provided a laser measuring device, which includes a first light emitter for emitting first wavelength light having a first wavelength; a second light emitter for emitting second wavelength light having a second wavelength, the second light emitter being arranged perpendicular to the first light emitter; an optical mirror for allowing one of the first wavelength light and the second wavelength light to pass but reflecting the other one; a first band pass filter for allowing the first wavelength light to pass; a second band pass filter for allowing the second wavelength light to pass; a light receiver for receiving incident light, which arrives through one of the first and second band pass filters; and a controller for controlling at least one of the first and second light emitters to be activated.

The laser measuring device may further include a vertical scanning mirror for vertically scanning an object to be measured; and a horizontal scanning mirror for horizontally scanning the object.

The controller may locate the first band pass filter in front of the laser measuring device and moves the second band pass filter from an optical path of the incident light when the first light emitter is activated. Alternatively, the controller may locate the second band pass filter in front of the laser measuring device and move the first band pass filter from an optical path of the incident light.

The controller may control the first light emitter and the second light emitter, so that the first light emitter is activated when nose caused by solar radiation exceeds a predetermined level, and the second light emitter is activated when the nose caused by solar radiation is up to the predetermined level.

The laser measuring device may further include a switching unit for switching the first and second band pass filters.

This is because the first band pass filter is used when light emitted from the first light emitter is used, and the second band pass filter is used when light from the second light emitter is used.

The switching unit may include a seating portion, which seats, thereon, the first and second band pass filters to be symmetrical about a central axis.

The controller may rotate the switching unit around the central axis, so that the first band pass filter is located in front of the laser measuring device, and the second band pass filter moves from an optical path of the incident light, when the first light emitter is activated. Alternatively, the controller may rotate the switching unit around the central axis, so that the second band pass filter is located in front of the laser measuring device, and the first band pass filter moves from an optical path of the incident light, when the second light emitter is activated.

The controller may acquire time data of at least one of the first wavelength light and the second wavelength light, and time data of the incident light to operate the acquired time data. In the case where the first light emitter is activated to generate the first wavelength light, the second wavelength light generated by the activation of the second light emitter can be used as reference light in distance calculation.

The laser measuring device may further include a beam splitter for reflecting a portion of the first wavelength light and the second wavelength light and allowing another portion of the first wavelength light and the second wavelength light to pass, wherein the light receiver is located across an optical path of the reflected or allowed light portion, and receives part of the reflected light portion. Here, light receiver may be located collinear with the beam splitter.

The controller may calculate the distance by operating velocity of light and a distance between "received time of the light portion reflected from the beam splitter" and "received time of the light portion arriving through one of the first and second band pass filters."

The laser measuring device may further include a reflector located opposite the light receiver, wherein the light portion, reflecting from the beam splitter, is reflected or dispersed from the reflector before entering the light receiver.

The laser measuring device may further include a condenser lens located on the optical path of the light portion passed through the beam splitter, to condense the light portion passed through the beam splitter.

As set forth above, the invention can provide the laser measuring device using two or more wavelength lights This makes it possible to use a wavelength light, which has little nose, in response to changes in surrounding environments, thereby maintaining high responsivity.

Accordingly, the laser measuring device can provide more correct measurement and long distance measurement due to reduced noise, and the safety and reliability of a product can be ensured.

Furthermore, since the light receiver for receiving emitted light and the light receiver for receiving incident light are integrated into one light receiver using the beam splitter, a fewer number of components are used in the laser measuring device of the invention. As a result, product price is reduced, the structure of the device is simplified, and the process is simplified.

Moreover, the laser measuring device of the invention locates the path of light entering the light receiver to be perpendicular to the path of light emitted from the light emitter, thereby maximizing responsivity. Accordingly, the laser measuring device having a more compact and simpler structure can have maximized responsivity.

BRIEF DESCRIPTION OF THE DRAWINGS

The above and other objects, features and other advantages of the present invention will be more clearly understood from the following detailed description, taken in conjunction with the accompanying drawings, in which.

DETAILED DESCRIPTION OF THE PREFERRED EMBODIMENT

The present invention will now be described more fully with reference to the accompanying drawings, in which exemplary embodiments thereof are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
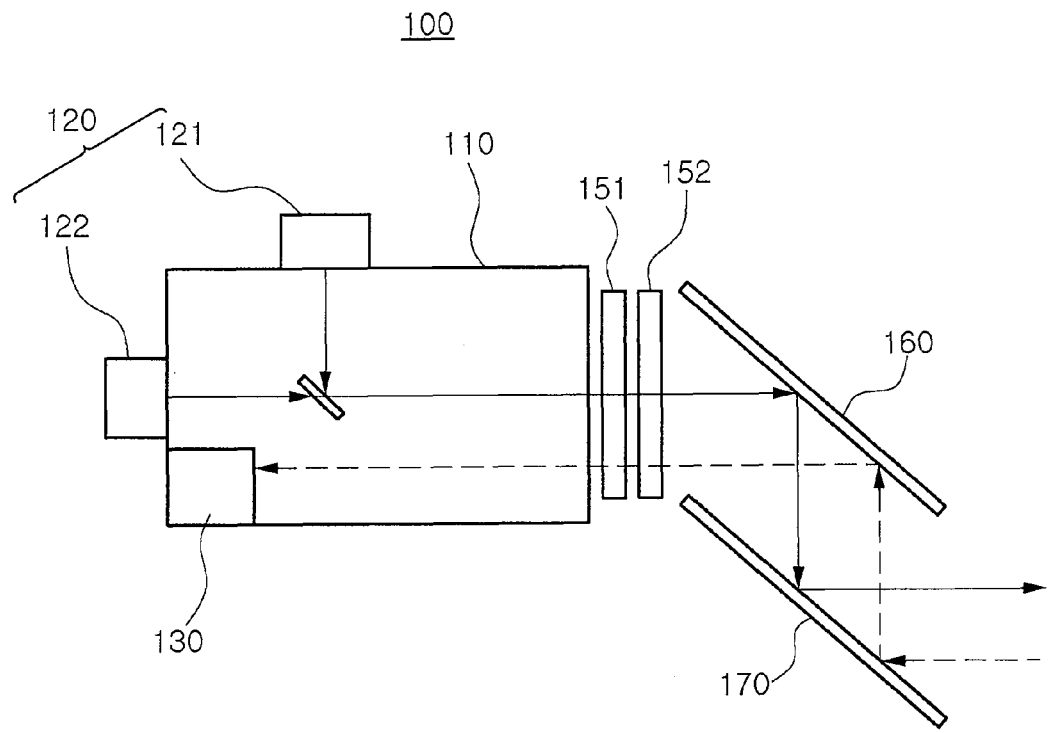
FIG. 1 is a configuration view illustrating a laser measuring device according to an embodiment of the invention.
Figure 2:
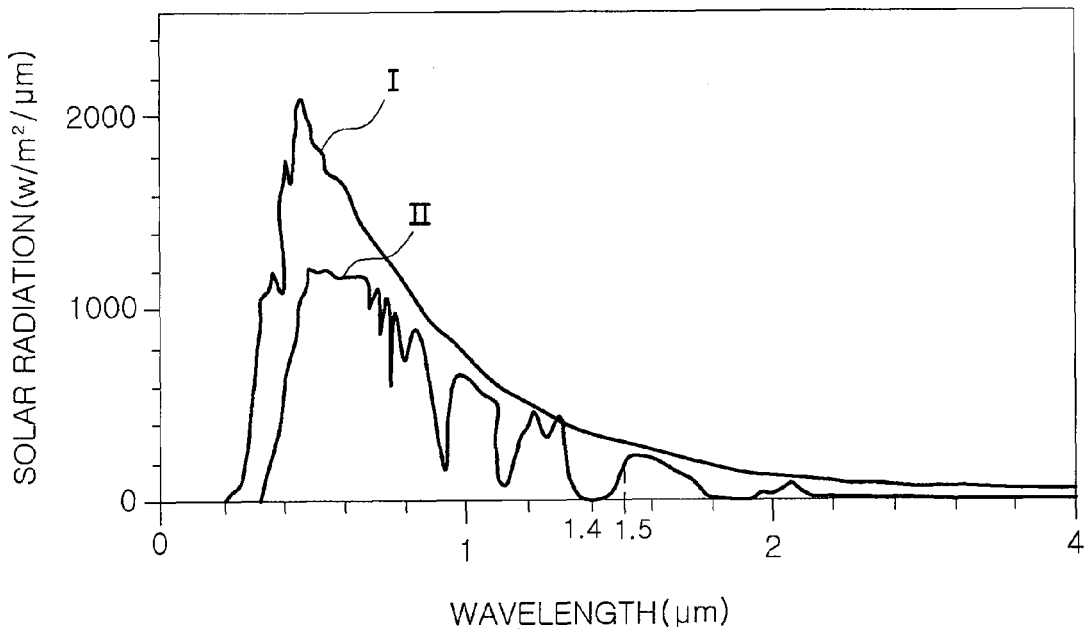
FIG. 2 is a graph illustrating the intensity of solar radiation according to wavelength.

FIG. 1 is a configuration view illustrating a laser measuring device according to an embodiment of the invention, and FIG. 2 is a graph illustrating the intensity of solar radiation according to wavelength. Below, a description will be made with reference to FIGS. 1 and 2.

The laser measuring device 100 of this embodiment includes a first light emitter 121 for emitting first wavelength light having a first wavelength, a second light emitter 122 for emitting second wavelength light having a second wavelength, the second light emitter 122 being arranged perpendicular to the first light emitter 121, an optical mirror 140 for allowing one of the first wavelength light and the second wavelength light to pass but reflecting the other one, a first band pass filter 151 for allowing the first wavelength light to pass, a second band pass filter 152 for allowing the second wavelength light to pass, a light receiver 130 for receiving incident light, which arrives through one of the first and second band pass filters 151 and 152, and a controller (not shown) for activating at least one of the first and second light emitters 121 and 122 to emit light.

The laser measuring device 100 of this embodiment includes two light emitters 121 and 122, which emit different wavelengths of light. The first light emitter 121 emits light having a first wavelength (hereinafter referred to as "first wavelength light"), and the second light emitter 122 emits light having a second wavelength (hereinafter referred to as "second wavelength light").

Referring to FIG. 1, the first light emitter 121 and the second light emitter 122 may be oriented in such a fashion that their central axes and optical axes of emitted light are perpendicular to each other. Accordingly, the optical mirror 140 allows light emitted from the first light emitter 121 and the second light emitter 122 to travel on the same optical axis. As an alternative, the optical axes of the first and second light emitters 121 and 122 may be arranged to be parallel to each other, thereby using two optical paths. In this case, each of band pass filters 151 and 152 are located on a corresponding optical path.

Since two light emitters 120 (including 121 and 122) are provided, two wavelengths can be used. The wavelengths, that is, the light emitters 121 and 122 can be variously selected according to surrounding environments. The first and second light emitters 121 and 122 may be configured to generate different wavelengths of light. Here, the first wavelength may be about 1.4 (1.410±0.050) μm, and the second wavelength may be about 1.5 (1.550±0.050) μm.

FIG. 2 is a graph illustrating the intensity of solar radiation according to wavelength. A curve I indicates the intensity of solar radiation outside the atmosphere, and a curve II indicates the intensity of solar radiation on the sea surface. The difference between I and II indicates the absorption of solar radiation by the air.

In the case of selecting a wavelength of light used in the laser measuring device 100, it is generally considered whether or not the wavelength may damage eyes of a user. The longer the wavelength is, the safer the light may be. For example, light having a wavelength, for example, about 1.55 μm, which is in the range of optical communication wavelength, may be used. However, referring to FIG. 2, the wavelength light of 1.55 μm is present in the air since it is slightly absorbed in the atmosphere. This wavelength light may unfortunately act as noise in the laser measuring device 100.

Accordingly, another wavelength of about 1.41 μm may be considered. Since this wavelength light is well absorbed in the atmosphere, it is possible to reduce noise in the laser measuring device 100. However, since the emitted light of the laser measuring device 100 can be also absorbed in the atmosphere, the quantity of light reflecting from an object to the laser measuring device 100 may also be reduced as an expense of little noise.

Desirably, 1.41 μm wavelength may be used in a clear day or at noon when a large amount of sunlight shines, and 1.55 μm wavelength may be used in a cloudy day or at night when there is no sunlight noise. The 1.41 μm wavelength may be used in short distance measurement since it may be absorbed in the air, and the 1.55 μm wavelength may be used in long distance measurement. Accordingly, based upon the sunlight noise exceeding a predetermined level (clear day or noon) or not exceeding the predetermined level (cloudy day or night), the activity of light emitters 120 may be controlled to raise light receiving efficiency.

Since the light emitters 120 include the first light emitter 121 and the second emitter 122, the laser measuring device 100 may include the optical mirror 140, which allows one of the first wavelength light and the second wavelength light to pass but reflects the other one. Referring to FIG. 1, the optical mirror 140 is located on the optical axis of the second light emitter 122, and reflects the first wavelength light from the first light emitter 121 but allows the second wavelength light from the second light emitter 122. Since a single optical axis is used, it is possible to reduce the size and simplify the laser measuring device 100.

When the first or second wavelength light, which exited the laser measuring device 100, returns via reflection from the object, if only the first wavelength light is emitted, the controller (not shown) controls the first band pass filter 151 to be located on the optical axis, thereby allowing only the first wavelength light to pass. If only the second wavelength light is emitted, the controller controls the second band pass filter 152 to be located on the optical axis, thereby allowing only the second wavelength light to pass. For example, when the first light emitter 121 emits 1.55 μm wavelength light, the first band pass filter 151 allowing only 1.55 μm wavelength light to pass is located on the optical path.

The light receiver 130 receives incident light through one of the first band pass filter 151 and the second band pass filter 152. Below, the structure of the light emitters 120 and the light receiver 130 will be described in detail with reference to FIGS. 3A and 3B.

The controller (not shown) activates at least one of the first and second light emitters 121 and 122 to emit light. The controller can control the activation of the first or second light emitter 121 or 122 according to specific factors such as surrounding environment. For example, when sunlight noise exceeds a predetermined level, the first light emitter 121 using 1.55 μm wavelength light may be activated. On the other hand, when sunlight noise does not exceed the predetermined level, the second light emitter 122 using 1.41 μm may be activated.

The controller (not shown) can calculate the distance by acquiring and operating time data of emitted one of the first wavelength light and the second wavelength light and time data of the received light. A process of calculating the distance will be described more fully later with reference to FIG. 4.

When the first light emitter 121 is activated, the controller (not shown) may also locate the first band pass filter 151 in front of the laser measuring device 100, that is, on the optical path of incident light but locate the second band pass filter 152 out of the optical path of incident light. When the second light emitter 122 is activated, the controller (not shown) may also locate the second band pass filter 152 in front of the laser measuring device 100, that is, on the optical path of incident light but locate the first band pass filter 151 out of the optical path of incident light The laser scanning device of this embodiment may also include a vertical scanning mirror 160, which vertically scans an object to be measured and a horizontal scanning mirror 170, which horizontally or laterally scans the object. Accordingly, the laser measuring device 100 of the invention can measure not only the distance but also the horizontal and vertical positions of the object.

The vertical scanning mirror 160 may be implemented as, for example, a galvano mirror, whereas the horizontal scanning mirror may be implemented as, for example, a rotation mirror. The rotation mirror is mounted on a rotary motor, which can rotate the mirror for 360°, in order to send light in a horizontal direction. The galvano mirror can reciprocally move at a predetermined angle about a rotary axis in order to send light in a vertical direction. The vertical scanning mirror 160 may also be provided with an acousto-optical deflector or an electro-optical deflector to increase a vertical scanning range.

Figure 3A:
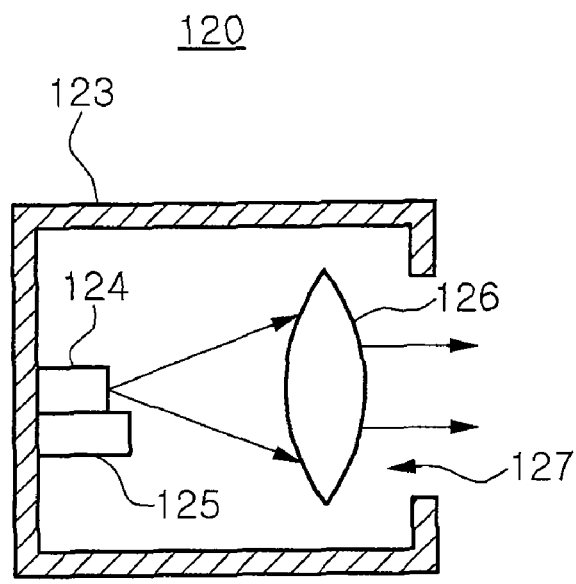
FIG. 3A is a cross sectional view illustrating a light emitter of the laser measuring device of the invention.
Figure 3B:
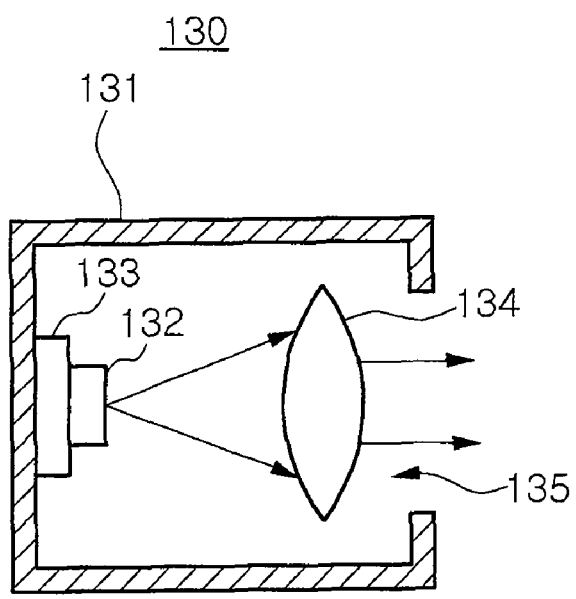
FIG. 3B is a cross sectional view illustrating a light receiver of the laser measuring device of the invention.

FIG. 3A is a cross sectional view illustrating a light emitter of the laser measuring device of the invention, and FIG. 3B is a cross sectional view illustrating a light receiver of the laser measuring device of the invention. One of the light emitters (the first light emitter 121 or the second light emitter 122) includes a body 123, a light emitting device 124 and a support 125, which supports the light emitting device 124. The light emitter 120 may also include a condenser lens 126 on the optical path of light emitted by the light emitting device 124 in order to condense emitted light. Condensed light exits the light emitter 120 through a first opening 127. The light emitting device 124 may be implemented as, for example, a laser diode.

As shown in FIG. 3B, the light receiver 130 includes a body 131, a light receiving device 124 and a support 133, which supports the light receiving device 132. The light receiver 130 may also has a condenser lens 134 on the optical device entering the light receiving device 132 in order to condense incident light, which enters the light receiver 130, into the light receiving device 132. The light receiving device 132 may be implemented as, for example, a photo diode.

Figure 4:
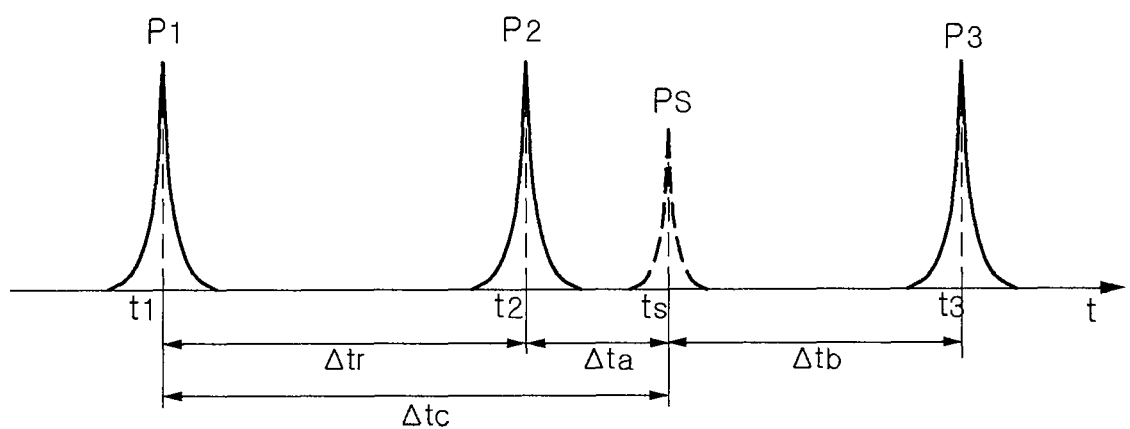
FIG. 4 is a graph illustrating the time relationship of radiation pulses and received pulses in the laser measuring device according to an embodiment of the invention.

FIG. 4 is a graph illustrating the time relationship of radiation pulses and received pulses in the laser measuring device according to an embodiment of the invention. In the following discussion FIGS. 1, 3A and 3B will also be referred to.

Referring to FIG. 4, radiation pulses $P_1$, $P_2$ and $P_3$, spaced apart from each other, are emitted at time $t_1$, $t_2$ and $t_3$. In the following description, time unit will be nanosecond (ns). A received pulse $P_s$ is indicated by a dotted line between $P_2$ and $P_3$. The received pulse $P_s$ arrives at a time $t_s$. Accordingly, in order to calculate the distance to an object, a round trip time $\Delta t_a$ is obtained by subtracting $t_2$ from $t_s$. Since light travels 30 cm/ns regarding its velocity, the distance to the object is calculated by multiplying $\Delta t_a/2$ with 30 (cm).

When the controller (not shown) activated, for example, the first light emitter 121, the radiation pulses $P_1$, $P_2$ and $P_3$, spaced apart from each other, are pulses emitted from the first light emitter 121. The time intervals of the $P_1$, $P_2$ and $P_3$ can be controlled by the controller.

However, as can be seen from FIG. 4, the interval between $P_2$ and $P_s$ is smaller than the interval between $P_s$ and $P_1$, or $P_s$ and $P_3$. In some cases, it is difficult to precisely measure the time interval. Particularly, in the case of measuring an object in a relatively shorter distance, measurement may be more difficult since $\Delta t_a$ becomes smaller.

The controller (not shown) may activate the second light emitter 122 from a deactivated state before or after activating the first light emitter 121 to emit light. Here, the second wavelength light from the second light emitter 122 may be used as reference light for distance measurement. That is, when the controller controls the emission time interval of the first and second light emitters 121 and 122 and stores time interval data, the time interval can be obtained with reference to the second wavelength light.

For example, $P_2$ is the first wavelength light, $P_s$ is the received light, $P_1$ and $P_3$, is the second wavelength light from the second light emitter 122, the distance can be calculated as follows: The time interval between the received pulse $P_s$ and the reference $P_1$ is $\Delta t_a$, and the time for distance measurement can be obtained by subtracting $\Delta t_r$ from $\Delta t_c$.

When the reference light from the second light emitter 122 is emitted later than the first light emitter 121, the reference pulse is $P_3$. Since the time interval between the received pulse $P_s$ and the reference pulse $P_3$ is $\Delta t_b$, and the time interval between the radiation pulse $P_2$ and the reference pulse $P_1$ is $\Delta t_r$, which is stored in the controller, the time necessary for calculating the distance can be obtained by subtracting $\Delta t_b$ from $\Delta t_r$.

Figure 5A:
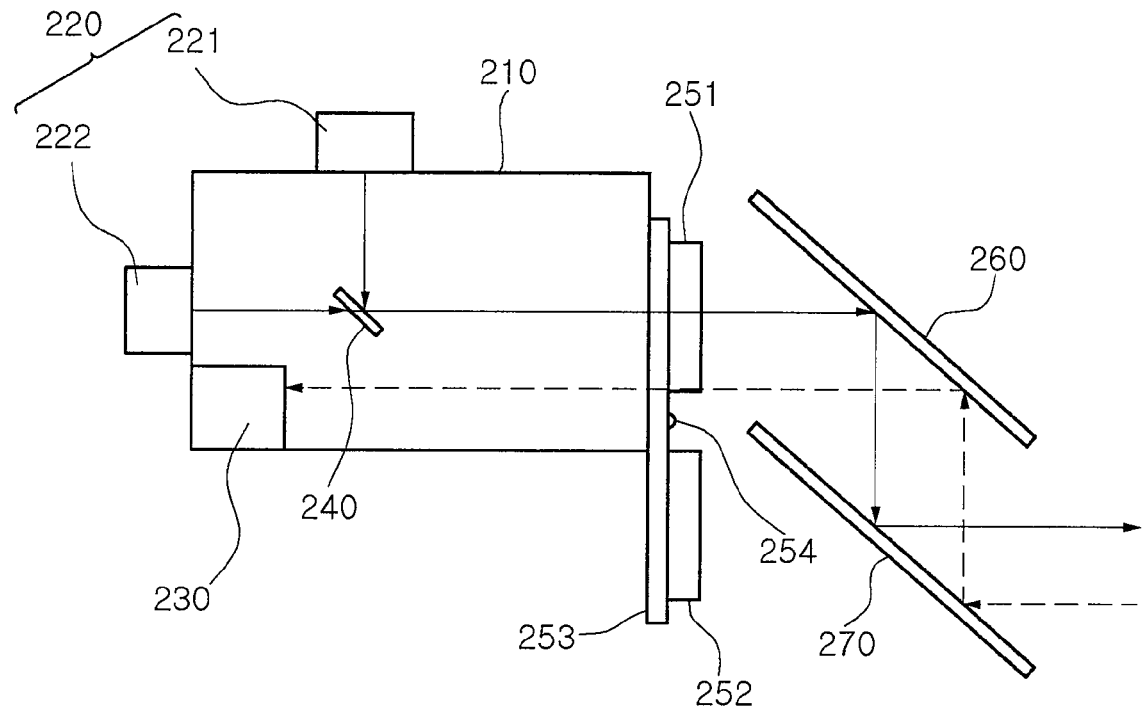
FIG. 5A is a configuration view illustrating a laser measuring device according to an embodiment of the invention, in which band pass filters corresponding to the wavelengths of light emitters are seated on a switching unit.
Figure 5B:
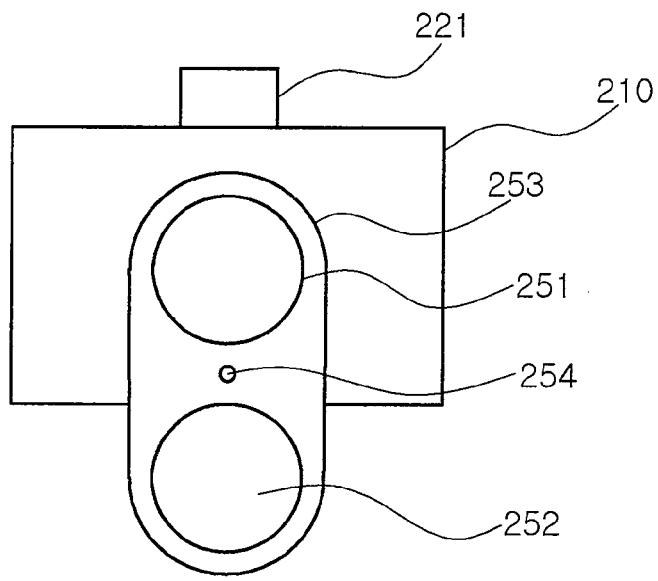
FIG. 5B is a side elevation view of FIG. 5.

FIG. 5A is a configuration view illustrating a laser measuring device 200 according to an embodiment of the invention, in which band pass filters corresponding to the wavelengths of light emitters are seated on a switching unit, and FIG. 5B is a side elevation view of FIG. 5.

The laser measuring device of this embodiment may also include a switching unit 253 and 254, which switch the first band pass filter 251 and the second band pass filter 254. The first band pass filter 251 and the second band pass filter 254 cannot be used simultaneously since the first wavelength and the second wavelength are different. Accordingly, the first band pass filter 251 is used when light emitted from the first light emitter 221 is used, and the second band pass filter 252 is used when light from the second light emitter 222 is used.

The switching unit includes a seating portion 253, which seats, thereon, the first and second band pass filters 251 and 252 to be symmetrical about a central axis 254.

In the case where the first emitter 221 is activated, the controller (not shown) controls the switching unit (seating portion 253) to turn around the central axis 254, thereby locating the first band pass filter 251 in front of the laser measuring device 200, that is, on the optical path of incident light. Accordingly, the second band pass filter 252 is moved from the optical path of incident light.

When the second light emitter 222 is activated, the controller (not shown) rotates the seating portion 253 around the central axis 254 to locate the second band pass filter 252 in front of the laser measuring device 200 but moves the first band pass filter 251 from the optical path of incident light.

Figure 6:
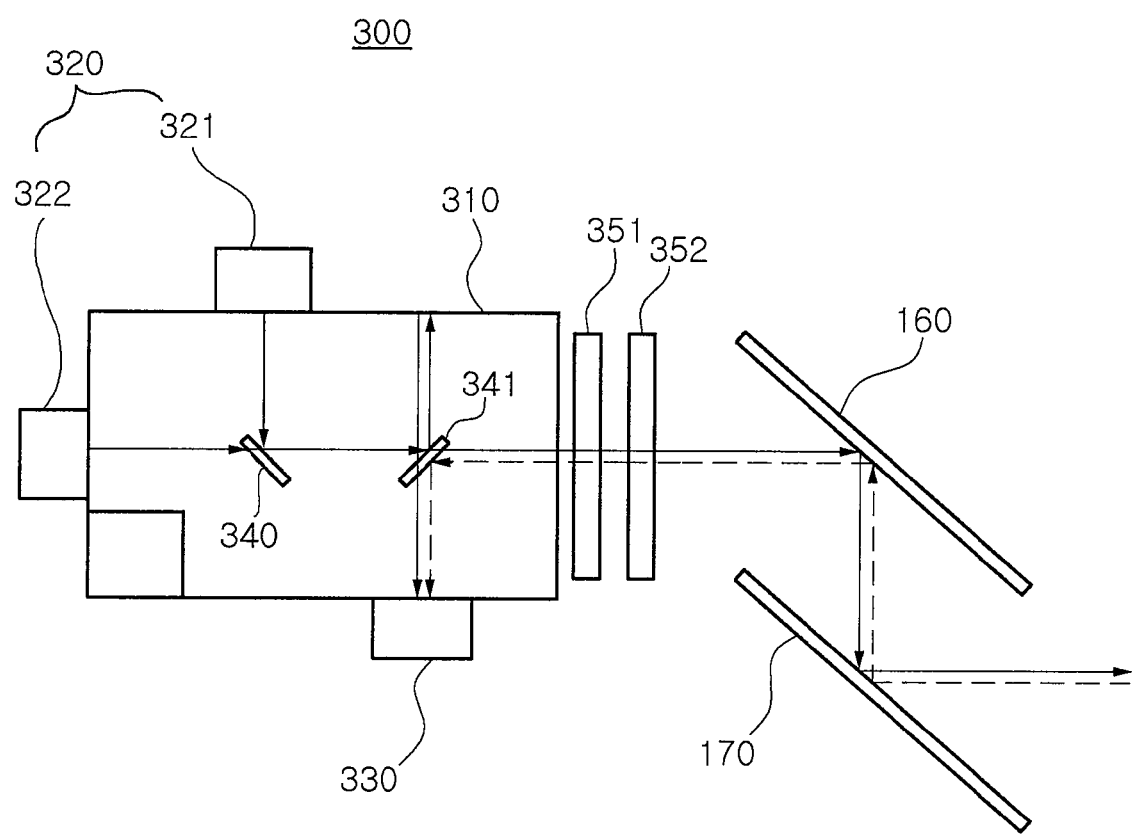
FIG. 6 is a configuration view illustrating a laser measuring device according to an embodiment of the invention.

FIG. 6 is a configuration view illustrating a laser measuring device 300 according to an embodiment of the invention. The laser measuring device 300 of this embodiment also includes a beam splitter 341, which reflects a portion of first wavelength light and second wavelength light and allows another portion of the first wavelength light and the second wavelength light to pass. A light receiver 330 is located across an optical path of the reflected or allowed light portion, and receives part of the reflected light portion. In the following description, other components such as first and second light emitters 321 and 322, an optical mirror 340 and first and second band pass filters 351 and 352 will not described in detail since have the same construction as in the foregoing description.

When emitted light (i.e., one of the first wavelength light and the second wavelength light, which is emitted), which exited the laser measuring device 300, returns through one of the first and second band pass filters 351 and 352 by reflection from an object to be measured, the light receiver 330 receives returning light. The central axis of the light receiver 330 is oriented perpendicular to the optical path of returning or passing light. When the emitted light is partially deviated from the optical path by the beam splitter 341, the light receiver 330 can receive the deviated light when it reflects or disperses from a body 310.

The light receiver 330 is located perpendicular to the optical path of the emitted light, but incident light, that is, light entering the laser measuring device 330 travels along or nearby the optical path of the emitted light. That is, it can be considered that the light emitter 320 and the light receiver 330 use the same optical axis.

Accordingly, it is possible to reduce the size and simplifying the structure of the laser measuring by using the single optical axis. Furthermore, even if the single optical axis is used, the light receiver 330 receives the light reflected by the beam splitter 341, and thus the light emitter 320 does not disturb incident light. Accordingly, incident light can be received without an obstacle, and higher responsivity can be obtained.

The beam splitter 341, located on the optical path of the emitted light, reflects a portion of light having a wavelength the same as that of the emitted light, but allows another portion thereof to pass. The beam splitter 341 is configured to extract a portion of the emitted light from the optical path, so that the light portion is used as a reference pulse. The beam splitter 341 reflects a portion of the emitted light, in which the reflected light portion is required to propagate toward an object such as the body 310, which can reflect or disperse again the reflected light portion.

The ratio that the beam splitter 341 splits the emitted light, that is, reflection-transmission ratio of light is adjusted based on the intensity of the emitted light (i.e., the intensity of a light source), the distance to an object, the responsivity (sensitivity) of the light receiver 330 and so on. The beam splitting ratio of the beam splitter 341 can be expressed by the ratio of transmitting portion to reflecting portion of light, which is in the range from 10:90 to 90:10. Partial reflection or transmission of non-emitted light by the beam splitter 341 will be described more fully later with reference to FIG. 7.

The emitted light exits the body 310 of the laser measuring device 300 and travels toward the object to be measured. When the object reflects or disperses the emitted light, a portion of the reflected or dispersed light travels enters the laser measuring device (300) (hereinafter referred to as "incident light") passes through the first or second band pass filter 351 or 352, which allows a specific wavelength of incident light to pass.

The laser measuring device of this embodiment may also include a collimator lens, which is located on the optical path of light passing through the beam splitter, thereby collimating the passing light.

Figure 7:
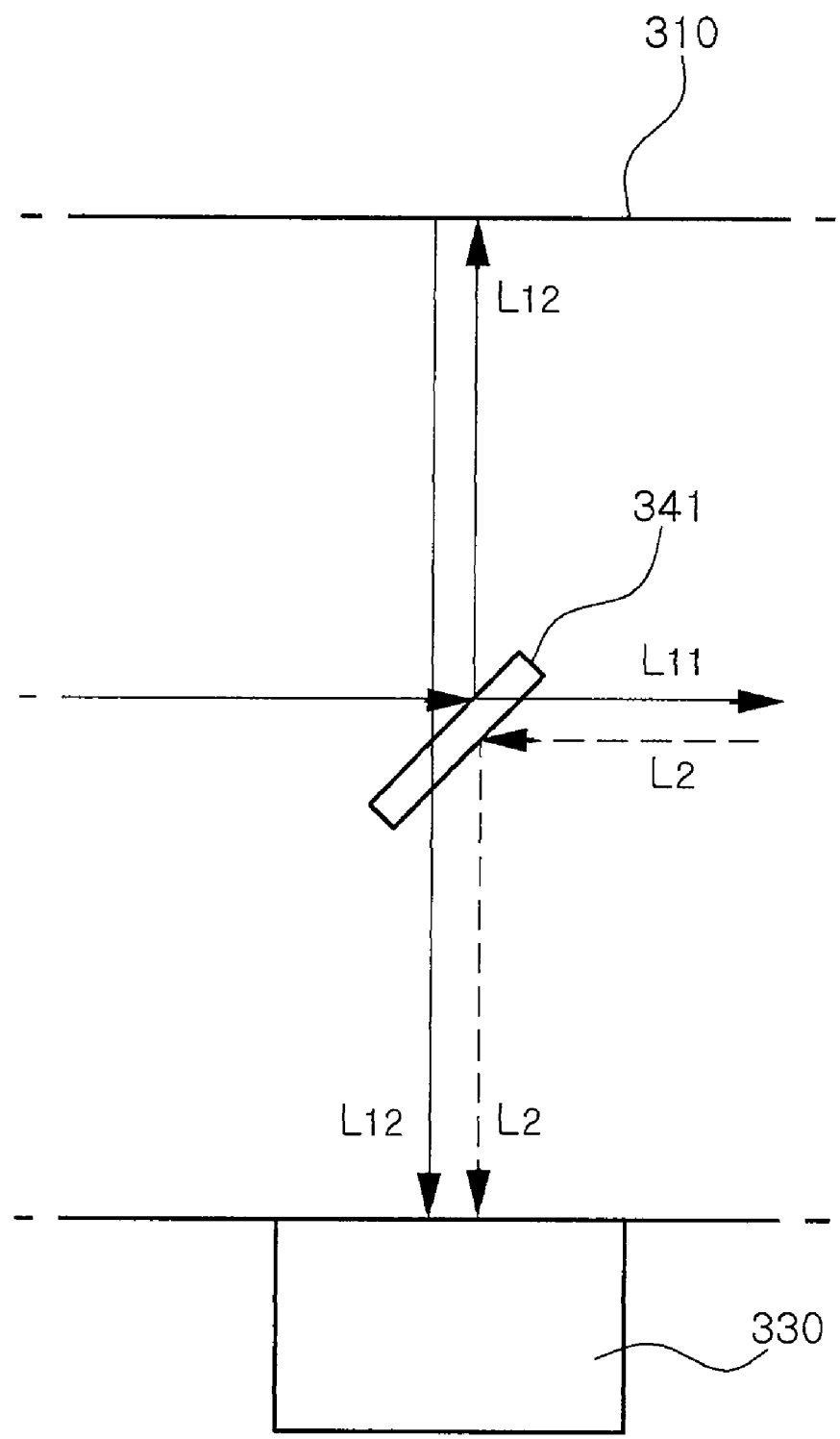
FIG. 7 is a configuration view illustrating light entering a light receiver and entering and reflecting from the beam splitter, disposed above the light receiver, in the laser measuring device according to the invention.

FIG. 7 is a configuration view illustrating light entering the light receiver 330 and entering and reflecting from the beam splitter 341, disposed above the light receiver, in the laser measuring device according to the invention. When emitted light $L_1$ is incident on the beam splitter 341, it is split into a reflected light portion $L_{11}$ and a transmitting light portion $L_{12}$. The reflected light portion $L_{11}$ travels again the optical path, reflects from the object, and enters again, as incident light $L_2$, the beam splitter 341. The incident light $L_2$ partially reflects from and partially transmits the beam splitter 341 before entering the light receiver 330.

The transmitting light portion $L_{12}$ reaches the body 310, reflects or disperses from the surface of the body 310, and directs toward the light receiver 330. The light receiver 330 receives and acquires time data of the transmitting light portion $L_{12}$ and the incident light $L_2$.

Figure 8:
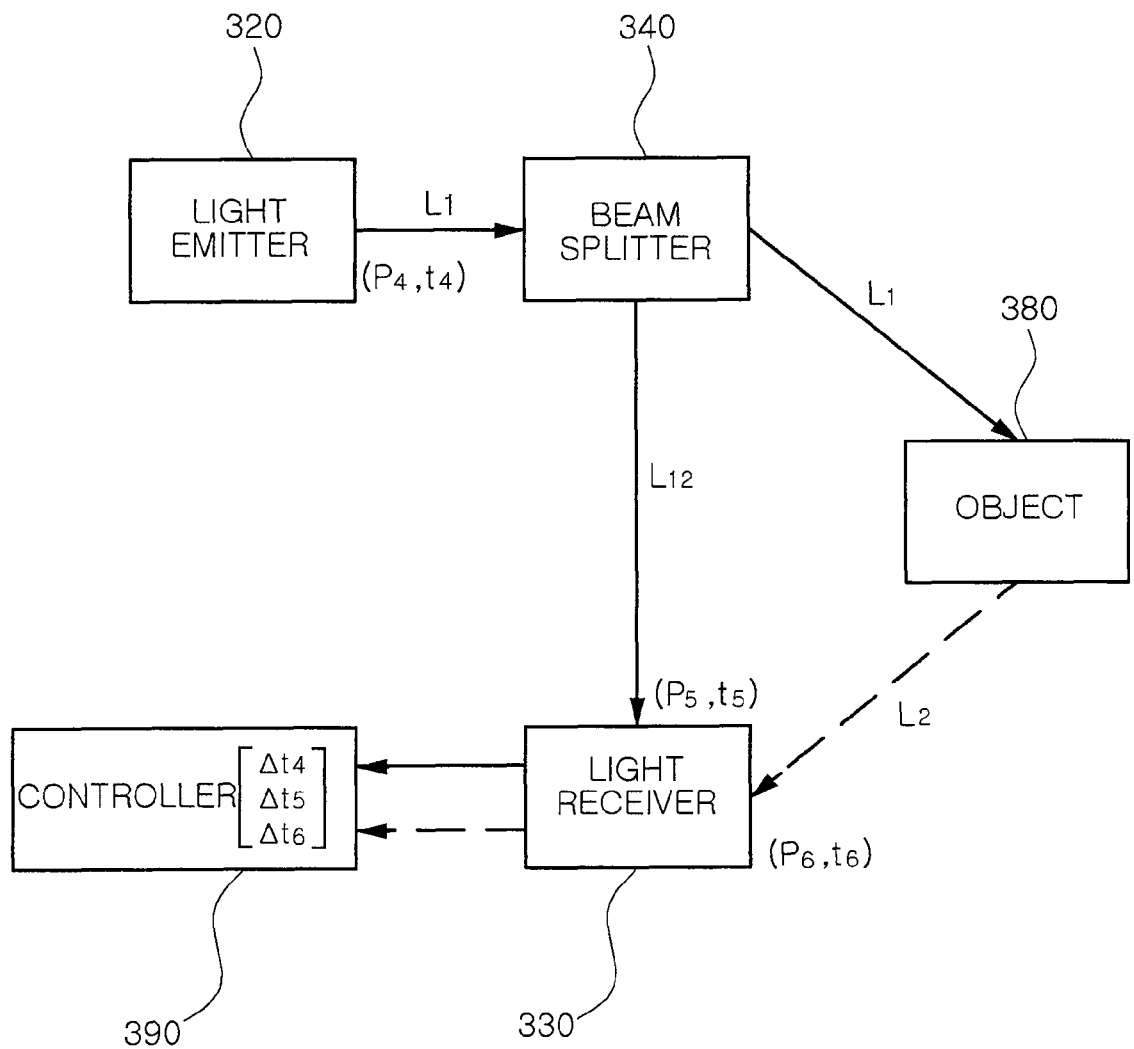
FIG. 8 is a schematic block diagram illustrating light, which travels along a path, in the laser measuring device of the invention.
Figure 9:
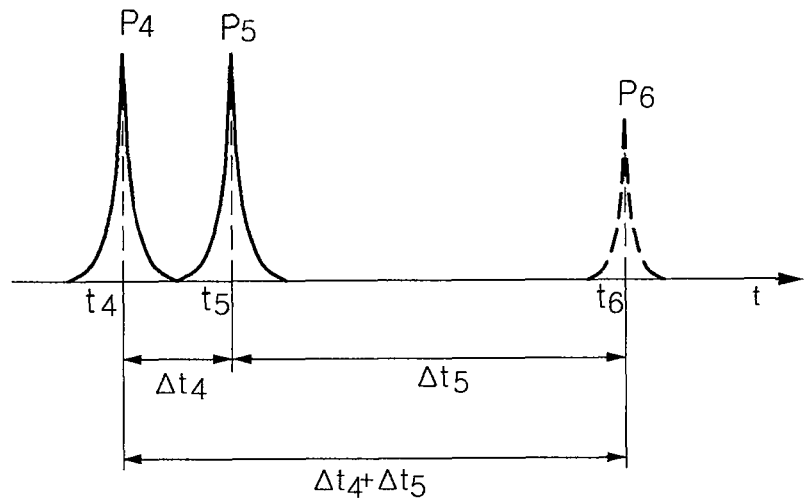
FIG. 9 is a graph illustrating the time relationship of radiation pulses and a received pulse in the laser measuring device of the invention.

FIG. 8 is a schematic block diagram illustrating light, which travels along a path, in the laser measuring device of the invention, and FIG. 9 is a graph illustrating the time relationship of radiation pulses and a received pulse in the laser measuring device of the invention. Below, a description will be made of a calculating data method of the laser measuring device 30, in which time unit will be nanosecond (ns).

A controller 390 of the laser measuring device 300 calculates a distance by acquiring time data from the light receiver 330. The controller 390 can calculate the distance to an object to be measured by operating the difference between a time when reflecting light is received and a time when incident light is received with velocity of light.

In FIG. 8, emitted light $L_1$ is generated as a radiation pulse $P_1$ at a time $t_4$, is split into a transmitting light portion $L_{11}$ and a reflected light portion $L_{12}$. Here, $L_{12}$ is a reference pulse $P_5$, $t_5$ is a time when the light receiver 330 receives the reference pulse $P_5$. The transmitting light portion $L_{11}$, reflects or disperses from an object 380, and then enters, as incident light $L_2$, the laser measuring device 300 through a band pass filter (not shown). $P_6$ is a received pulse of the incident light $L_2$, and $t_6$ is a time when the received pulse $P_6$ is received.

Referring to FIG. 9, first, $P_4$ appears at $t_4$, and then, an internal reflected portion of the reflecting light portion appears as a reference pulse $P_5$ at $t_5$ after passing through the beam splitter 341. After a predetermined time passed, the received pulse $P_6$ appears at a time $t_6$. The time interval between the pulses $P_4$ and $P_5$ is $\Delta t_4$, the time interval between the pulses $P_5$ and $P_6$ is $\Delta t_5$, and the time difference between the pulses $P_4$ and $P_6$ is $\Delta t_4 + \Delta t_5$. The controller can previously store $\Delta t_4$ since it is a constant value.

Accordingly, the controller 390 can acquire the entire time that the emitted light travels before received by using the previously stored value $\Delta t_4$ and the times $t_5$ and $t_6$. Since the entire time is a round trip time, the trip time to the object is $(\Delta t_4 + \Delta t_5)/2$. Since light travels 30 cm/ns regarding its velocity, the distance to the object is calculated by multiplying $(\Delta t_4 + \Delta t_5)/2$ with 30 (cm).

If the distance between the laser measuring device 300 and the object 380 is sufficiently larger than the laser measuring device 300, $\Delta t_5$ will have a considerably larger value than $\Delta t_4$. In this case, the distance may be calculated by multiplying $\Delta t_5$ with 30 (cm) but neglecting $\Delta t_4$.

Figure 10:
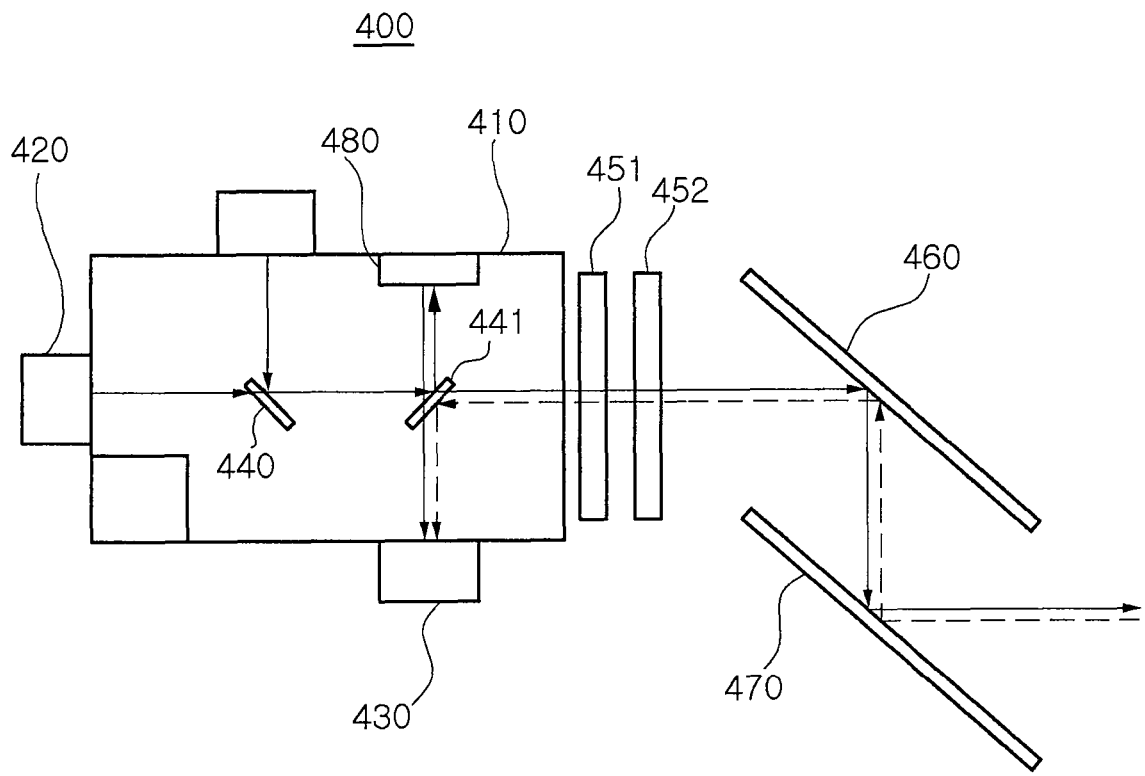
FIG. 10 is a configuration view illustrating a laser measuring device according to an embodiment of the invention, which has a reflector.

FIG. 10 is a configuration view illustrating a laser measuring device according to an embodiment of the invention, which has a reflector. The laser measuring device 400 of this embodiment may also include the reflector 480 in a position opposite a light receiver 430. Except for the reflector 480, other components such as a body 410, light emitters 420, a light receiver 430, a beam splitter 440, band pass filters 450, a vertical scanning mirror 460 and a horizontal scanning mirror 470 have the same construction as in the foregoing description, and thus will not described in detail.

The reflector 480 reflects or disperses the reflected light portion from the beam splitter to enter the light receiver 430. Desirably, the reflector 480 is located on and nearby a straight line defined by the beam splitter 440 and the light receiver 430 since it must reflect or disperse the reflected light portion toward the light receiver 430.

Incident light can be used as reference light (see the reference pulse in FIG. 9). Advantageously, the single light receiver 430 can receive emitted light and incident light without an additional light receiver for emitted light.

While the present invention has been shown and described in connection with the exemplary embodiments, it will be apparent to those skilled in the art that modifications and variations can be made without departing from the spirit and scope of the invention as defined by the appended claims.

What is claimed is:

1. A laser measuring device, comprising:
    a first light emitter for emitting first wavelength light having a first wavelength;
    a second light emitter for emitting second wavelength light having a second wavelength, the second light emitter being arranged perpendicular to the first light emitter;
    an optical mirror for allowing one of the first wavelength light and the second wavelength light to pass but reflecting the other one, so that the first wavelength light passes when noise caused by solar radiation exceeds a predetermined level, and the second wavelength light passes when the noise caused by solar radiation is below the predetermined level;

a first band pass filter for allowing the first wavelength light to pass;

a second band pass filter for allowing the second wavelength light to pass;

a light receiver for receiving incident light, which arrives through one of the first and second band pass filters; and a controller for controlling at least one of the first and second light emitters to be activated.

2. The laser measuring device of claim 1, further comprising:

a vertical scanning mirror for vertically scanning an object to be measured; and a horizontal scanning mirror for horizontally scanning the object.

3. The laser measuring device of claim 1, wherein the controller locates the first band pass filter in front of the laser measuring device and moves the second band pass filter from an optical path of the incident light when the first light emitter is activated.

4. The laser measuring device of claim 1, wherein the controller locates the second band pass filter in front of the laser measuring device and moves the first band pass filter from an optical path of the incident light.

5. The laser measuring device of claim 1, wherein the first wavelength is 1.4 μm, and the second wavelength is 1.5 μm.

6. The laser measuring device of claim 5, wherein the controller controls the first light emitter and the second light emitter, so that the first light emitter is activated when noise caused by solar radiation exceeds a predetermined level, and the second light emitter is activated when the noise caused by solar radiation is up to the predetermined level.

7. The laser measuring device of claim 1, further comprising:

a switching unit for switching the first and second band pass filters, wherein the switching unit includes a seating portion, which seats, thereon, the first and second band pass filters to be symmetrical about a central axis.

8. The laser measuring device of claim 7, wherein the controller rotates the switching unit around the central axis, so that the first band pass filter is located in front of the laser measuring device, and the second band pass filter moves from an optical path of the incident light, when the first light emitter is activated.

9. The laser measuring device of claim 7, wherein the controller rotates the switching unit around the central axis, so that the second band pass filter is located in front of the laser measuring device, and the first band pass filter moves from an optical path of the incident light, when the second light emitter is activated.

10. The laser measuring device of claim 1, wherein the controller acquires time data of at least one of the first wavelength light and the second wavelength light, and time data of the incident light to operate the acquired time data.

11. The laser measuring device of claim 1, wherein the controller sets the second wavelength light, emitted from the activated second light emitter, as reference light, when the first light emitter is activated to emit the first wavelength light.

12. The laser measuring device of claim 1, further comprising:

a beam splitter for reflecting a portion of the first wavelength light and the second wavelength light and allowing another portion of the first wavelength light and the second wavelength light to pass, wherein the light receiver is located across an optical path of the reflected or allowed light portion, and receives part of the reflected light portion.

13. The laser measuring device of claim 12, wherein the light receiver is located collinear with the beam splitter.

14. The laser measuring device of claim 12, wherein the controller calculates a distance by operating velocity of light and a distance between "received time of the light portion reflected from the beam splitter" and "received time of the light portion arriving through one of the first and second band pass filters."

15. The laser measuring device of claim 12, further comprising:

a reflector located opposite the light receiver, wherein the light portion, reflecting from the beam splitter, is reflected or dispersed from the reflector before entering the light receiver.

16. The laser measuring device of claim 12, further comprising:

a condenser lens located on the optical path of the light portion passed through the beam splitter, to condense the light portion passed through the beam splitter.

* * * * *